Oct. 19, 1954   E. M. BARBER   2,691,968
TWO-STROKE INTERNAL-COMBUSTION ENGINE
AND METHOD OF OPERATING SAME
Filed April 24, 1952   2 Sheets-Sheet 1
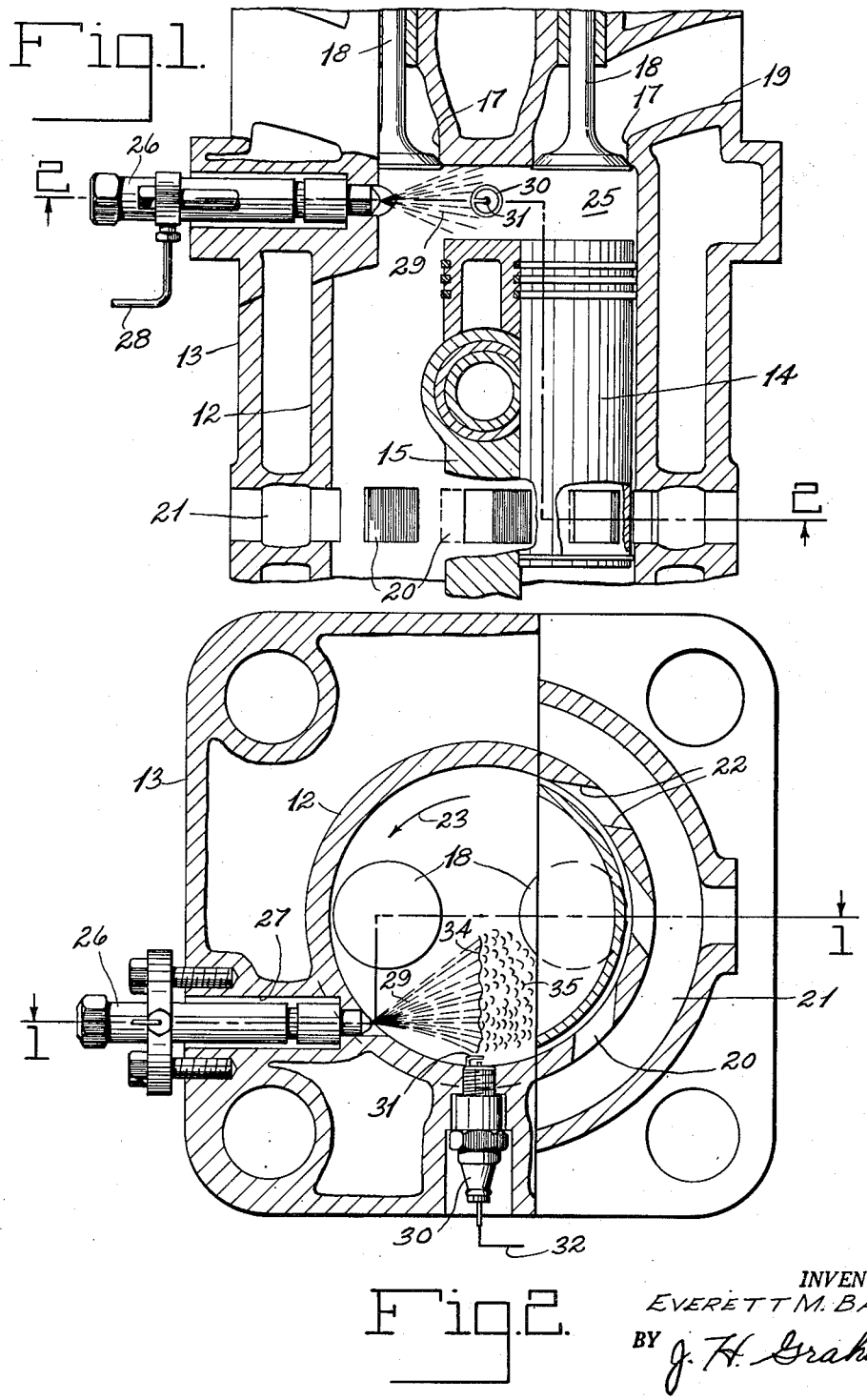
INVENTOR.
EVERETT M. BARBER
BY J. H. Grahame
ATTORNEY Oct. 19, 1954
E. M. BARBER
2,691,968
TWO-STROKE INTERNAL-COMBUSTION ENGINE
AND METHOD OF OPERATING SAME
Filed April 24, 1952
2 Sheets-Sheet 2
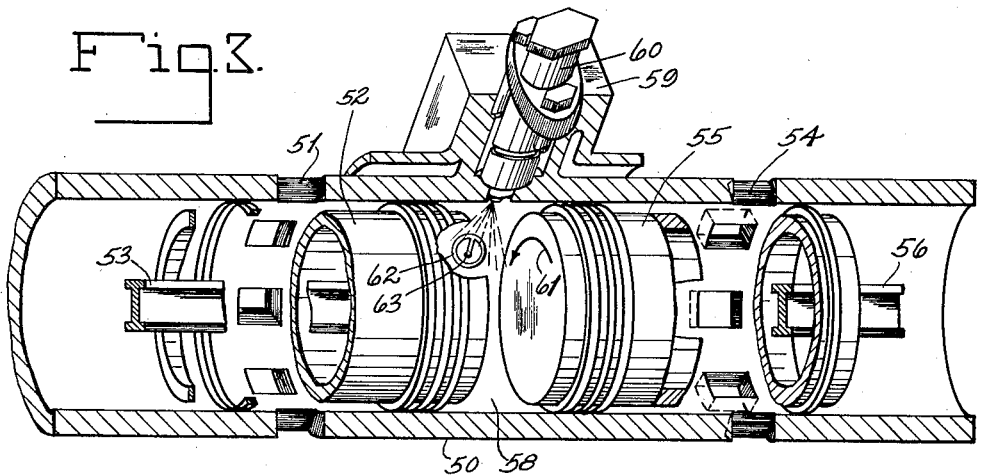
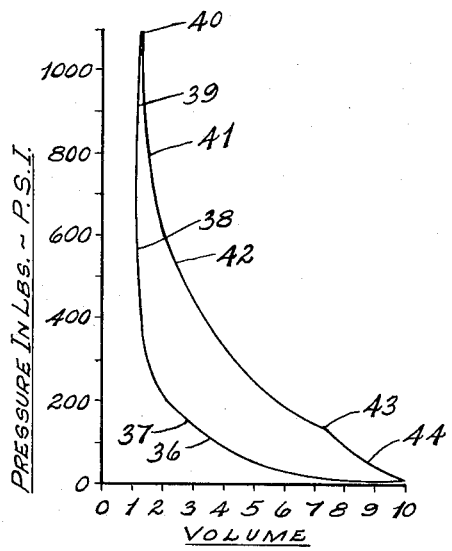
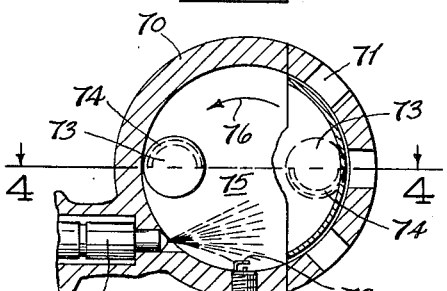
INVENTOR.
EVERETT M. BARBER
BY J. H. Grahame
ATTORNEY Patented Oct. 19, 1954

2,691,968

UNITED STATES PATENT OFFICE 2,691,968

TWO-STROKE INTERNAL-COMBUSTION ENGINE AND METHOD OF OPERATING SAME

Everett M. Barber, Wappingers Falls, N. Y., assignor to The Texas Company, New York, N. Y., a corporation of Delaware Application April 24, 1952, Serial No. 284,075

7 Claims. (Cl. 123—32)

1

This invention relates to a two-stroke fuel-injection positive-ignition engine operating on the Otto combustion cycle, particularly a medium to a high speed variable load engine of this character.

This is a continuation-in-part of my copending application Serial No. 11,577 filed February 27, 1948, now abandoned which in turn is a continuation-in-part of Serial No. 10,598 filed February 25, 1948, now Patent No. 2,484,009 dated October 11, 1949. The latter is a continuation-in-part of Serial No. 513,232 filed December 7, 1943, now abandoned, which in turn is a continuation-in-part of Serial No. 463,031 filed October 23, 1942, now abandoned.

One of the principal objects of the present invention is to provide a medium to high speed variable load two-stroke engine operating on the Otto combustion cycle, without knocking irrespective of the fuel employed, which is capable of efficient operation and control at part loads as well as at full load, is free from the difficulties of fuel loss during scavenging as well as uncontrolled ignition and has good scavenging at all loads.

Other objects and advantages of the invention will be apparent from the following description, the attached drawing, and the appended claims.

The advantage of two power strokes in two-stroke operation over one power stroke in four-stroke operation for each two revolutions of the crankshaft has long been recognized. Nevertheless, high speed spark-ignition variable load engines operating on the Otto cycle, such as automotive and airplane engines, have primarily been four-stroke engines in commercial practice. This is due to the the fact that proper scavenging of two-stroke engines operating at full load on the Otto cycle with preformed or carbureted charge mixture resulted in loss of fuel with the scavenged products, and encountered some difficulty with pre-ignition, and the reduced mixture charge on throttling for part load or idling failed to provide the required scavenging such that control of the engine at reduced load was erratic and efficiency was poor.

The net result is that two-stroke operation in commercial practice has been mainly confined to large size low-speed diesel engines operating with fuel injection and compression ignition, providing typical diesel combustion. Some success has been attained with large size low-speed gas engines, and with combined gas and fuel injection engines, using spark-ignition, where the load is relatively constant. Consequently, their field of use is limited, and they have not been employed for variable load automotive and aeronautical purposes.

In accordance with the present invention, two-stroke operation in a high speed positive ignition variable load engine utilizing Otto cycle combustion is satisfactorily attained by a novel combination of features, some of which are separately old in other relationships. An element of this combination involves non-knocking combustion of the type claimed in my said Patent 2,484,009; and this feature is combined in a novel manner with other features to produce an entirely new two-stroke engine providing new and outstanding results and advantages. This novel combination of features involves the introduction of a full or unthrottled charge of air, or air unmixed with sufficient fuel to support combustion, for scavenging on each cycle irrespective of engine speed and load, the air being introduced from adjacent one end of the cylinder in a manner to impart a high velocity swirling movement to the air within the cylinder so as to force products of combustion ahead of the swirling column of air out through the exhaust adjacent the opposite end of the cylinder in a uniflow arrangement. The air inlet ports are constructed to provide air swirl of a particular type and velocity, namely substantially "solid body" air rotation in which all portions of the mass of air within the cylinder rotate with substantially equi-angular velocity about the swirl center of the disc-shaped combustion space, and the swirl rate is maintained within the range of 5 to 9 rotations per engine revolution over the operating speed range of the engine. This has been found critical in providing both the proper scavenging and also efficient high power combustion. Sufficient air is introduced to effect substantially complete scavenging before closing of the exhaust port or ports; and to provide an adequate charge of air in the cylinder for the next combustion cycle. This charge of swirling air is then compressed during further movement of the piston on the compression stroke following closing of the air intake ports, while the said high velocity solid body air swirl movement of the compressed air is maintained within the range of 5-9 rotations per engine revolution. Approximately 50 to 20 crank angle degrees prior to top or inner dead center position of the piston on its compression stroke, the injection of liquid fuel into a localized portion of said compressed swirling air is initiated, so as to impregnate with fuel a localized segment of the swirling air on one side of the disc-shaped combustion space as the air rotates past the locus of fuel injection, the impregnation with fuel of the localized portion being at a substantially uniform fuel-air weight ratio of 0.05 to 0.09. Promptly after the initiation of fuel injection, the first increment of injected fuel is positively ignited, as by spark, less than 75 degrees of swirling movement of the impregnated segment from the locus of injection and substantially as soon as combustible fuel vapor-air mixture is formed therefrom, and consequently before uncontrolled ignition is possible. This establishes a flame front which travels through the localized mixture segment counter to the direction of air swirl. The injection of liquid fuel is then continued into following localized portions of fresh compressed air which swirl past the locus of injection and immediately in advance of the traveling flame front at the said uniform fuel-air weight ratio of 0.05 to 0.09, with the result that additional combustible fuel vapor-air mixture is progressively formed and immediately ignited by the traveling flame front and burned substantially as rapidly as formed, to develop the power required on each cycle. The load control of the engine is thus regulated solely by the quantity of fuel injected and consequently the proportion of the swirling air charge impregnated on each cycle, while the air remains unthrottled and a full charge is introduced on each cycle irrespective of load.

The time of initiating fuel injection is coordinated with the rate and duration of injection so as to provide an approximately constant volume pressure rise of typical Otto cycle combustion closely adjacent the top or inner dead center position of the piston, which then undergoes adiabatic expansion on the power stroke until the opening of the exhaust ports. The said exhaust ports are opened during the latter part of the power stroke, but well in advance of the completion thereof and prior to the time in said power stroke when the air intake ports are opened for scavening. The cycle is then repeated.

During the combustion phase of the cycle, products of combustion rotate away from the flame front as fresh compressed air mass rotates toward the flame front. The traveling flame front is thus confined on its rear side by a layer of said combustion products and on its front side by a layer of incombustible gas. Due to the fact that combustion is initiated immediately after the start of fuel injection, which latter is controlled to impregnate only a localized segment of the swirling air, there is an insufficient accumulation of combustible fuel vapor-air mixture at the time of the controlled positive ignition to result in knocking of the engine, irrespective of the octane number or cetane number of the fuel employed, the volatility of the fuel over a broad range, the compression ratio, the fuel-air mixture ratio and the fuel-air mixture density used. Also, since the controlled positive ignition occurs substantially as soon as any combustible mixture is formed, uncontrolled ignition from residual hot gases of other causes is not possible even though scavenging were not complete. Due to the full charge of air introduced irrespective of load, and the substantial time period in the cycle provided for scavenging, good scavenging is assured at all loads, so that danger of uncontrolled ignition from residual hot gases is effectively prevented. Further, due to the fact that the traveling flame front is confined at all times during the combustion phase by incombustible layers on both sides thereof, and the progressively formed fuel vapor-air mixture during the continuance of injection is consumed by combustion substantially as rapidly as produced, there is no opportunity for the accumulation of highly compressed and heated end gases consisting of combustible fuel vapor-air mixture which are susceptible of spontaneous ignition, and knocking is not possible.

Summarizing, the present novel engine combination thus involves a two-stroke fuel-injection positively ignited variable load engine operating with non-knocking combustion in which fuel is burned substantially as fast as it is introduced on the Otto combustion cycle, and employing solid body air swirl of 5-9 rotations per engine revolution, a full unthrottled charge of air irrespective of load with preferably uniflow scavenging, and load control solely by the quantity of fuel injected per cycle. This affords results and advantages in a two-stroke engine not heretofore attained.

The invention is illustrated in the attached drawing which discloses preferred embodiments thereof, and wherein Fig. 1 is a partial vertical sectional view taken on the plane of the line 1—1 of Fig. 2 of a two-stroke reciprocating piston engine constructed in accordance with the present invention, and having air intake ports in the cylinder wall controlled by the piston, and exhaust ports in the cylinder head controlled by engine-driven poppet valves;

Fig. 2 is a horizontal sectional view taken on the plane of line 2—2 of Fig. 1;

Fig. 3 is a vertical sectional view of a modified engine of the opposed piston type constructed in accordance with the present invention;

Fig. 4 is a partial vertical sectional view similar to Fig. 1 of another modification having air inlet ports in the head controlled by shrouded intake valves, and exhaust ports in the cylinder wall controlled by the piston, the view being taken on the plane of the line 4—4 of Fig. 5;

Fig. 5 is a horizontal sectional view taken on the plane of the line 5—5 of Fig. 4; and Fig. 6 is a typical pressure-volume indicator diagram of the engine of the present invention.

Referring to Figs. 1 and 2, the engine cylinder is indicated at 12 with cooling jacket 13, piston 14, and connecting rod 15, which runs to the usual crankshaft, not shown. The cylinder is equipped with two exhaust ports 17 controlled by poppet valves 18, operated from the engine crankshaft through a suitable cam shaft and tappet drive in conventional manner. The exhaust ports 17 open into exhaust passages 19 leading to a common exhaust manifold. The cylinder 12 is provided with a circumferential series of air intake ports 20 extending through the wall thereof, and communicating with an intake manifold 21. As shown, the ports 20 are located adjacent the opposite end of the cylinder from the exhaust ports 17; and the ports 20 are located somewhat above the lower or outer dead center position of the piston 14 at the termination of its power stroke. Reciprocation of the piston thus controls the opening and closing of the air intake ports, while the cam and tappet drive controls the exhaust ports, thereby rendering the timing of the exhaust and intake ports independent of each other, but synchronized with engine operation.

In the usual installation, the exhaust ports 17 are set to open about 55–80 degrees before bottom or outer dead center position of the piston on its power stroke. The intake ports 20 will then start to open after the opening of the exhaust ports upon further movement of the piston on its power stroke, and generally about 45–65 degrees before bottom center. The lag of intake opening after exhaust opening is sufficient to provide a blow-down time which reduces cylinder pressure substantially to intake air pressure. As shown more particularly in Fig. 2, the side faces of each of the intake ports 20 are inclined, with respect to the radius of the cylinder, as indicated at 22, to impart a directional movement to the air entering the cylinder approaching the tangential. It will be noted that the right hand or downstream side face 22 of each port 20 is directed tangentially to an inscribed concentric circle of the combustion space which very closely approximates the cylinder wall; for example, the diameter of the inscribed concentric circle is about 95–99% of the cylinder bore. The left hand or up-stream face 22 of each port is substantially parallel to the down-stream face. A completely tangential port (down-stream side) has been found to be poor in scavenging efficiency and may be restrictive in port area. On the other hand, if the ports do not approach the tangential to the extent specified above, a vortex air movement results which reduces both scavenging efficiency as well as combustion efficiency. The construction shown is designed to provide substantially solid body air swirl, and afford high scavenging efficiency as well as high combustion efficiency. This provides a high velocity air swirl within the cylinder of substantially the solid body air rotation type in the direction of the arrow 23. The swirling mass of air rises in a column in the cylinder following the opening of the intake ports 20, forcing the products of combustion from the previous cycle out through exhaust ports 17 in unidirectional flow. By the provision of plural exhaust ports 17, coupled with the stratifying action of the swirling air mass rising in a column and largely preventing appreciable mixing of the entering air with the products of combustion, as well as the independent regulation of the timing of the exhaust and intake ports, substantially complete scavenging of the cylinder can be obtained on each cycle regardless of engine load or speed.

On the return compression stroke of piston 14, the exhaust ports 17 are closed through the cam drive about 40–75 degrees after bottom center which may be before the piston has again completely covered the air intake ports 20. By the time the exhaust ports close, the rising column of swirling air has reached the locus of the exhaust ports and thus forced substantially all of the combustion products out into the exhaust manifold. Generally the arrangement is such that piston 14 will close the intake ports 20 about 0–10 degrees of crank angle movement after closing of the exhaust ports. Of course, in this embodiment of the invention where the piston controls the intake ports 20, they will be closed the same time after bottom center as they were opened before bottom center, which is generally about 45–65 degrees, as noted above. But, in any event, the exhaust ports open first on the power stroke and may close first on the following compression stroke; and the independent control enables both sets of ports to remain open for a substantial period of the cycle of the order of 100–120 degrees or more of crank angle movement, which insures good scavenging and a full air charge, even with high speed engines.

Upon the continued movement of piston 14 on its compression stroke following closing of the air intake ports 20, the charge of swirling air within the cylinder is compressed into the disc-shaped combustion space 25 confined between the cylinder and the piston. Moreover, the substantially solid body swirling movement of the compressed air is maintained during this period, such that the R. P. M. of the air is 5–9 times the R. P. M. of the engine, preferably about 6–7 times, near the end of the compression stroke.

A fuel injection nozzle 26 extends through a suitable opening 27 in the cylinder head, and, as shown, is directed to discharge a cone shaped spray into one side of a diameter of the disc-shaped combustion space 25 in the direction of air swirl, so as to uniformly impregnate with fuel a localized portion of the swirling air mass across a radius of the combustion space. It will be understood that liquid fuel is supplied by a suitable fuel pump driven by the engine in conventional manner to the injection piping 28 at controlled periods in the engine cycle, and under a pressure of about 500–15000 pounds per square inch; and that the fuel injection nozzle 26 is equipped with the customary pressure operated check or pintle valve opening under the high pressure fuel supply during the injection period, and causing the fuel to be injected into the combustion space 25 in the form of a highly atomized spray 29 at one side of the combustion space. As distinguished from two-stroke diesel operation, where fuel is injected in dispersed fuel droplets largely throughout the combustion space close to top dead center position of the piston, such as about 18–10° before top dead center to compensate for ignition lag, and the ignition is secured by compression with resultant slow burning of the dispersed fuel droplets more or less heterogeneously throughout the combustion space, the present invention provides for the initiation of injection about 50–20 crank angle degrees before top dead center. Moreover, the injection is controlled to impregnate only a localized segment of the swirling air mass at one side of the combustion space, at a controlled uniform fuel-air weight ratio of 0.05 to 0.09 which rapidly becomes a combustible fuel vapor-air mixture, and this segment is positively ignited close to the locus of fuel injection, namely, less than 75° of swirling movement from the locus of injection, by positively controlled ignition.

For this purpose, a spark plug 30 is mounted in the cylinder wall having electrodes 31 positioned close to the periphery of the combustion space 25. Spark plug 30 is connected by lead 32 in a conventional ignition circuit, which is actuated in synchronism with the engine to produce a spark at electrodes 31 at the time the first increment of injected fuel from nozzle 26 has formed combustible fuel vapor-air mixture, and is susceptible to ignition. It is thus seen that the positioning of plug 30 is correlated with the positioning of nozzle 26 and the velocity of air swirl so as to be within the region of the impregnated localized segment where combustible fuel vapor-air mixture is first formed. Very satisfactory operation is secured with the arrangement shown where the electrodes 31 are located more than 20° and less than 75°, preferably about 30–45°, of radial angle from the locus of fuel injection. Moreover, the nozzle 26 is preferably directed to discharge in a fan or cone-shaped spray, the outer edge of which closely approaches the electrodes 31. Since the outer edge of the spray is generally more diffuse, the swirling air picks up this portion of the fuel with rapid vaporization thereof to form the combustible mixture that contacts electrodes 31 substantially as soon as formed. In the arrangement shown the provision of a spark at electrodes 31 about 4-10 crank angle degrees after the initiation of injection, insures ignition with the flame then spreading rapidly across the localized impregnated segment to produce the flame front indicated at 34 extending generally across a radius of the combustion space.

It will be understood that the combustion in this case is that of a combustible mixture consumed at a single flame front and is distinct from the heterogeneous burning at a plurality of dispersed fuel-droplets or diesel combustion. However, instead of the combustion space 25 being filled, or substantially filled, with preformed combustible mixture at the time of ignition with the resulting flame front traveling outwardly from the point of ignition in a generally spherical path through the combustible mixture, as in conventional Otto cycle engines, there is only the small localized segment opposite the plug 30 at the time of ignition. The flame front thus spreads across this combustible segment and travels counter to the direction of air swirl through succeeding portions of combustible mixture formed immediately in advance of the flame front as injection continues. The first formed products of combustion indicated at 35 rotate with the swirling mass away from the flame front 34 as fresh impregnated compressed air rotates toward the flame front. The established flame front 34 tends to travel toward the nozzle 26, but this actual movement is impeded by the high swirling movement within the combustion space and by the fact that the localized impregnated segment closer to the nozzle is incombustibly rich. The net result is that flame front 34 may remain comparatively fixed with respect to the cylinder wall, fuel nozzle and ignition plug, although it is traveling through a thin layer of combustible mixture formed immediately in advance of the flame front. Due to the fact that, at the time of ignition, there is insufficient formed combustible mixture in the cylinder to undergo spontaneous ignition or pre-ignition, these difficulties are overcome. Furthermore, at no time during the combustion period of each cycle is there an accumulation of sufficient unburned combustible mixture trapped by the flame front as to cause spontaneous ignition, and knocking is entirely prevented regardless of the octane or cetane number of the fuel employed.

It will be understood that the rate and duration of fuel injection on each cycle is under the control of the fuel pump in conventional manner. Moreover, by initiating injection sufficiently early in the cycle before top dead center, by controlling the rate of injection and the distribution of the injected fuel throughout the swirling air mass at one side of the combustion space to provide a desired localized or patch fuel-air ratio, and by controlling the duration of injection in accordance with the velocity of swirling movement of the air to provide for the impregnation of that proportion of the air mass required for the particular load condition of the engine, the peak pressure rise of combustion occurs closely adjacent top dead center position of the piston in typical Otto cycle operation. This is illustrated more particularly in Fig. 6 which is a typical pressure-volume diagram of the two-cycle engine of the present invention. Thus, the numeral 36 indicates the adiabatic compression of the swirling air mass following the closing of the air intake ports 20. The numeral 37 indicates the point in the cycle for ignition and initiation of combustion substantially in advance of top dead center, with the resultant rapid pressure rise indicated at 38 to top dead center 39, and with the peak pressure rise 40 occurring very soon after top dead center. This means that combustion has been about half completed by top dead center whereby the peak pressure rise is most effective to drive the piston on its power stroke. Combustion is substantially complete at the point 41 of the power stroke and this is followed by adiabatic expansion 42 down to the point 43 where the exhaust valves open to rapidly reduce the pressure, as indicated at 44.

It is to be understood that the spray pattern 29, the fuel intensity of the jet, and the velocity of the swirling air can be altered and correlated for different spacings of the plug and nozzle tip in order to obtain the desired knock-free operation. In this manner, the fuel vapor-air mixture is ignited almost as soon as it is formed and before an opportunity is afforded for the injected fuel to mix with air throughout any substantial extent of the combustion space. The net result is that combustible fuel vapor-air mixture is produced only within a localized zone of the combustion space adjacent plug 30, and this mixture is surrounded and cushioned by incombustible air or products of combustion on its rear side and incombustibly rich mixture on its front side toward the nozzle. In characterizing the combustion space 25 as "disc-shaped" it is to be understood that this term is used in a broad sense as meaning a combustion space which is generally circular in cross section as produced by a geometrical figure spinning on its axis, but which may have various configurations in axial section due to dishing or crowning of the piston or cylinder head or both.

In the operation of the engine of Figs. 1 and 2, starting with the piston moving downwardly on a power stroke, exhaust valves 18 are opened preferably about 70 degrees before bottom center. Products of combustion start rushing out through the exhaust passages 19 to the exhaust manifold, thereby lowering the pressure substantially to that in the air intake manifold 21. About 50 degrees before bottom center, the air intake ports 20 start to open, and these remain open until after the closing of the exhaust ports 17 about 45 degrees after bottom center. During this prolonged period of the cycle, the rising column of swirling air pushes the remaining products of combustion ahead of it through the ports 17 to the exhaust passages. The intake ports 20 are then closed by the piston 50 degrees after bottom center, and the swirling mass of air remaining in the cylinder is then compressed into the combustion space 25 about the time of initiation of fuel injection on the compression stroke, which is substantially the position of the parts shown in Fig. 1. For full load maximum power operation, initiation of injection may begin about 50 degrees before top center, with combustion starting almost immediately and with a duration of injection of about 55-60 degrees, depending upon the velocity of air swirl, to substantially completely impregnate all the swirling air within the cylinder on one revolution thereof. The piston is thus driven on a new power stroke and the cycle repeated.

Figure 3 discloses a modification of the present invention involving a uniflow opposed piston engine. As shown, an elongated cylinder 50 is provided adjacent one end thereof with a circumferential series of inclined air intake ports 51 adapted to impart a high velocity swirling movement of the solid body rotation type to the air in a moving column as previously described. These ports are controlled by an air piston 52 having connecting rod 53 extending to a crankshaft (not shown) at the left-hand end of the cylinder in conventional manner. Cylinder 50 is also provided adjacent the opposite end thereof with a circumferential series of plain exhaust ports 54. The latter are controlled by exhaust piston 55 having connecting rod 56 extending to a second crankshaft (not shown) at the right-hand end of the cylinder. It will be understood that both crankshafts are connected through suitable gearing to a common driven shaft in conventional manner, so that on the power stroke when the pistons move away from each other, the power is transmitted from both pistons to the common driven shaft.

Mounted centrally of the cylinder opposite the disc-shaped combustion space 58 in a mounting block 59 is a fuel injection nozzle 60 directed to inject fuel into the combustion space 58 in the direction of air swirl indicated by the arrow 61. Also mounted in a suitable socket in cylinder 50 is a spark plug 62 having electrodes 63 positioned close to the periphery of combustion space 58 on the air downstream side of the tip of nozzle 60 in the relationship described above for Figs. 1–2. The exhaust piston 55 is connected through its crank so as to lead the air piston 52 by about 10–20° of crank angle movement, for example about 15°. This means that the exhaust piston 55 reaches its inner dead center position shortly before the air piston 52 by the indicated crank angle advance. However, actual longitudinal movement of the pistons adjacent their respective inner dead center positons is relatively slow in comparison to crank angle movement, so that the exhaust piston has moved outwardly on its power stroke only a slight distance at the time the air piston 52 reaches its inner dead center position; and then both pistons move outwardly and away from each other on the power stroke.

In operation of this modification, assuming the pistons moving outwardly on their power stroke, the exhaust piston 55 first uncovers exhaust ports 54 about 55–80° before outer center of the power stroke, the figures given referring to the so-called true outer center position where the cylinder volume is a maximum. About 20–25° later, the air piston 52 uncovers the air intake ports 51, whereupon the column of swirling air of the solid body rotational type moves to the right in uniflow direction through the cylinder and forces the combustion products ahead of it through the exhaust ports 54 by the time the exhaust piston 55 has returned on its compression stroke to again close ports 54. This will occur about 40–70° after true outer center position, and the air piston will then close the air intake ports about 50–70° after true outer center position. Further movement of the pistons toward each other then effects compression of the swirling air charge while its solid body rotation of 5 to 9 rotations per engine revolution is maintained. Fuel injection and spark ignition then occur in the manner described above for Figs. 1 and 2 to produce the non-knocking combustion on the Otto-cycle as previously described. The position of the pistons shown in Fig. 3 is just prior to inner dead center position of the air piston 52, and when the exhaust 55 has started outwardly on its power stroke, which is approximately true inner center position where the cylinder volume is a minimum.

In place of having the air intake ports controlled by the piston with uniflow travel of the swirling column of air toward exhaust ports controlled by poppet valves in the head, Figs. 4 and 5 illustrate a reverse arrangement which can be employed. As shown, the cylinder 70 is equipped with a circumferential series of plain exhaust ports 71 located somewhat above the lower portion of travel of the piston 72. Mounted in the cylinder head and controlled by conventional valve tappet mechanism driven from the engine are two air intake valves 73, each equipped with a shroud 74 extending 180° around the periphery of the valve. As shown, the outer edge of each of the valves is located closely adjacent to the periphery of the combustion space 75. The shrouds face in opposite directions with the valves positioned on opposite sides of the disc-shaped combustion space 75, and with the ends of each shroud positioned on a radius of the cylinder (Fig. 5). This produces solid body air swirl in the direction of the arrow 76 with a velocity of 5–9 rotations per engine revolution at the time of fuel injection. While two air intake ports and valves are shown, it is to be understood that particularly in smaller diameter cylinders, one air inlet port with shrouded poppet valve can be employed. Moreover, the shroud need not extend 180° about the valve as shown; but, in certain cases particularly where the intake port is also constructed to impart an air directional effect, a shroud of less than 180° and down to about 120° and set tangentially or approximately tangentially of the combustion space can be employed.

A fuel injection nozzle 77 is mounted in the side wall of the cylinder 70 in position to inject into the combustion space 76 in the direction of air swirl. A spark plug 78 having electrodes 79 is also mounted in the side wall of cylinder 70 on the downstream side of nozzle 77 in the relationship described above for Figs. 1–2. The operation of this form is essentially the same as that of Figs. 1–2, with the piston 72 opening exhaust ports 71 during the latter part of the power stroke, the valve tappet mechanism then opening air intake valve 73 with about a 20–25° lag from the opening of the exhaust ports, and the piston closing the exhaust ports during the initial part of the compression stroke somewhat prior to the closing of the intake valves. The unidirectional flow in this case is from the head toward the opposite inner end of the cylinder, which gives an additional length of time in each cycle for scavenging and cooling the tip of nozzle 77 and the electrodes 79 by the inflowing swirling column of fresh air. The non-knocking combustion occurs in the manner previously described for Figs. 1–2, with the timing of injection and spark ignition set to provide the peak pressure rise of Otto-cycle combustion close to the upper dead center position of piston 72.

While the present invention can be operated with a substantially instantaneous spark at the plug electrodes, this requires a critical coordination of the spark advance with the injection advance. For example, in the constructions shown in Figs. 1–7 employing injection in the direction of air swirl, the instantaneous spark should occur at the plug electrodes at an instant within the range of about 4–10° and preferably about 6° of crank angle movement following the start of fuel injection.

However, it has been found that the conventional magneto or coil ignition system has a spark duration of about 5–30 crank angle degrees at an engine speed of 1800 R. P. M. It has further been found that not all of this spark duration is of sufficient intensity to ignite the mixture, the spark tolerance for a particular combustion chamber construction varying with the characteristics of the ignition system and the conditions at the spark plug gap employed. With the conventional automotive ignition circuits of the magneto type utilizing the customary size plug gaps, a spark tolerance of the order of about 5–15° is usually afforded, this meaning that a spark of igniting intensity remains present during that interval. This is also true of conventional ignition circuits of the coil and breaker type.

It will be obvious from the above that, in general, the spark advance for the conventional automotive ignition system will be set in accordance with the present invention, to approximately correspond with the injection advance or very shortly thereafter. The important thing is that a spark of ignitable intensity should be present at the plug electrodes at the time the first increment of injected fuel in the form of combustible fuel vapor-air mixture reaches the plug electrodes, or not more than about 5–15 crank angle degrees thereafter such that insufficient combustible fuel vapor-air mixture has accumulated in the combustion space prior to ignition to permit knocking to occur or to permit uncontrolled ignition from the core of combustion products of the previous cycle.

While the conventional automotive ignition circuit functions very satisfactorily and provides a spark tolerance which removes the extreme criticality for exact setting of the spark advance in relation to the injection advance, it will be readily appreciated that a continuous spark of fairly long duration can be employed, if desired. While the continuous spark can be left on during the entire engine cycle, utilizing for example a continuous type of spark employed in fuel burner systems, it is obvious that this arrangement can be easily synchronized with engine operation so that the spark is on only for a selected period of the combustion phase, and can be turned off during the balance of the cycle.

In addition to spark ignition as set forth above, other electrical igniting means supplying electrical energy from an outside source, or other positive ignition means, can be used to positively ignite the first increment of injected fuel as soon as combustible fuel vapor-air mixture is formed therefrom. For example, a glow plug or glow-wire, connected in an electrical circuit containing an electromotive force sufficient to highly heat the plug or wires to a bright red or white heat, can be mounted in the engine cylinder in position to be contacted by the first formed increment of combustible mixture, in the manner set forth above for the mounting of the spark plug. This has been found to also positively effect ignition in the desired manner, even when starting the engine from cold or when idling. In addition to electrical ignition, other known forms of positive ignition, as distinguished from compression ignition, can be employed. For example, chemical ignition by the injection of a chemical, such as diethyl ether, at the location of the spark plug in the various figures of the drawing, at the proper moment in the cycle, when the first increment of the injected regular fuel has just formed combustible fuel vapor-air mixture and has reached that location, whereby the chemical instantly bursts into flame and positively ignites the mixture, can be used. Also, catalytic ignition such as by a platinum sponge, or pyrophoric ignition as with a hydrazine pyrophor, can be used. It will be understood that electrical ignition, and particularly spark ignition, is preferred.

Since the combustion phase of the present two-stroke engine is independent of the octane or cetane number of the fuel employed, the limitations previously imposed by knocking on the compression ratio which can be satisfactorily employed in Otto-cycle combustion, are entirely removed. Consequently, it is preferred to operate the present two-cycle engine at an increased compression ratio of the order of about 10:1, and with supercharging, if desired, to secure the higher power output and improved efficiency. Nevertheless, the present engine can be operated at ordinary compression ratios and will satisfactorily operate at compression ratios as low as 4:1. On the other hand, the only apparent limitations to further increasing the compression ratio involve structural considerations of piston and cylinder head clearances and valve operation, and structural strength. From the standpoint of providing a light weight high speed engine, a compression ratio of around 10:1 appears about optimum, since the improved metals and fabrications permit present standards of construction of automotive and airplane engines to be employed, thereby securing the advantage of increased power output for a given engine weight.

The two-stroke engine of the present invention can be satisfactorily operated on a wide variety of fuels of varying characteristics and volatilities including gasolines from about 20 to over 100 CFRM octane, normal heptane, isopentane, isooctane, cetane, alpha-beta-methyl naphthalene, kerosene, benzol, diesel fuel or gas oil, methyl alcohol, and even light lubricating oil. All fuels lighter than gas oil operate very satisfactorily without preheating. In addition to the liquid fuels, normally gaseous fuels of the character of butane can also be employed by utilizing sufficient pump pressure to maintain the fuel liquefied in the lines leading to the injection nozzle. In view of the fact that the present engine is not critical of the front end volatility or the boiling distribution range of the fuel and operates satisfactorily irrespective of the octane or cetane number thereof, it is apparent that the present invention opens up a wide variety of fuels for two-stroke Otto cycle internal combustion engine use. The essential requirements of the fuel are that it should be clean to avoid deposits and clogging of the fuel lines and nozzles, non-corrosive, and properly combustible when mixed with air in the proper proportion. From the standpoint of economy and availability a broad boiling range petroleum distillate of relatively low octane, such as a fraction boiling from about 100 to 500° F. and produced without special and expensive processing, constitutes a very satisfactory fuel for the present engine.

While the various embodiments of the invention discussed above employ uniflow scavenging and this is preferred, it is to be understood that the invention is not limited thereto. Thus, the combination of the other features described above in a two-stroke variable load engine operating on the Otto combustion cycle with non-knocking combustion, including substantially solid body air swirl of 5 to 9 rotations per engine revolution, fuel injection into a localized segment of the compressed solid body air swirl at one side of a diameter of the combustion space starting about 50-20° before top dead center of the piston compression stroke with immediate positive ignition, control of the rate and duration of injection following ignition to impregnate with fuel additional localized segments of the swirling air mass at a controlled fuel-air weight ratio of 0.05 to 0.09 with prompt burning of the segments as formed, with load control regulated solely by the quantity of fuel injected and consequently the proportion of air impregnated each cycle, to provide the peak pressure rise of Otto cycle combustion closely adjacent top dead center, and the long duration of at least 100 crank angle degrees of both exhaust opening and air intake opening as described, are of distinct advantage in two-stroke engines employing other types of scavenging, such as loop scavenging, focal scavenging, etc.

From the foregoing it will be apparent that the present invention provides a two-stroke internal combustion engine operating on the Otto combustion cycle with complete freedom from both pre-ignition and knock. The various features of the engine, as described above, mutually cooperate to achieve that result, which enables high speed two-stroke automotive and airplane engines to become a practical reality. The uniflow arrangement cooperates with the solid body air swirl, as well as the independent control of the exhaust and air intake, to provide good scavenging even in high speed engines, as well as the proper movement of the compressed air mass at the time of the combustion phase. The controlled fuel injection with correlated immediate positive ignition cooperates with the air swirl to prevent uncontrolled ignition and to provide the desired non-knocking combustion. The coordination of the injection advance and spark advance with the rate and duration of injection enable combustion on the Otto cycle to be accomplished in this wholly fuel-injection engine, and thus makes it adaptable to use in high speed variable load engines. Moreover, the full charge of air on each cycle, coupled with the controlled fuel injection and coordinated ignition to impregnate and burn only localized segments, contributes to good scavenging, high power at full load, and excellent fuel economy at part loads or idling. The successful accomplishment of two-stroke Otto cycle combustion of this character permits the construction of such variable speed and load engines of considerably smaller size for the same power, or of considerably increased power for the same engine size.

Obviously many modifications and variations of the invention, as hereinbefore set forth, may be made without departing from the spirit and scope thereof, and therefore only such limitations should be imposed as are indicated in the appended claims.

I claim:

1. The method in the operation of a two-stroke variable load internal combustion engine of the reciprocating piston type, which comprises initiating the exhaust of products of combustion from a cylinder of said engine during the latter part of the power stroke of the piston therein to blow down said cylinder to approximately air inlet pressure, then introducing unthrottled air irrespective of load during the latter part of the power stroke of said piston in a manner to impart a high velocity swirling movement of substantially the solid body rotational type of 5 to 9 rotations per engine revolution to the air within said cylinder and scavenge products of combustion therefrom through exhaust means, continuing the introduction of said unthrottled air and the scavenging of said cylinder into the initial part of the piston compression stroke for a total cycle time of exhaust of at least 100 crank angle degrees and of air introduction of at least 100 crank angle degrees, then compressing said air within said cylinder during continuance of said piston compression stroke while maintaining the solid body air swirl of 5 to 9 rotations per engine revolution, initiating the injection of liquid fuel into a localized portion of the compressed swirling air at one side of a diameter thereof about 50-20° before top dead center of said piston compression stroke, positively igniting the first increment of injected fuel less than 75° of swirling movement of the impregnated segment from the locus of injection and substantialy as soon as combustible fuel vapor-air mixture has formed therefrom and before uncontrolled ignition is possible to establish a flame front across a radius of said swirling air traveling therethrough counter to the direction of air swirl, continuing the injection of fuel into localized portions of fresh compressed swirling air at a controlled rate coordinated with the air swirl velocity and with a controlled distribution at said one side of a diameter of the swirling air immediately in advance of the formed flame front to impregnate said localized portions at a fuel-air weight ratio of 0.05 to 0.09, to thereby progressively form additional increments of combustible fuel vapor-air mixture which are ignited by said flame front and burned substantially as rapidly as formed, controlling the power developed on each cycle solely by the quantity of fuel injected and consequently the proportion of swirling air which is impregnated, the time of initiating fuel injection and the rate and duration of injection being coordinated to provide a peak pressure rise of Otto cycle combustion closely adjacent the top dead center position of said piston to efficiently drive the same on a power stroke, and repeating said cycle.

2. The method in the operation of a two-stroke variable load internal combustion engine of the reciprocating piston type having a disc-shaped combustion space as herein defined with Otto cycle combustion, which comprises introducing during the latter part of the power stroke of a piston in a cylinder of said engine unthrottled air from adjacent one end of said cylinder in a manner to impart a substantially solid body type of swirl to the air within said cylinder of about 5-9 rotations per engine revolution, the swirling air advancing in a column in uniflow direction through said cylinder and forcing out products of combustion from the previous combustion cycle ahead of the advancing swirling air through exhaust means adjacent the opposite end of said cylinder to effect substantially complete scavenging thereof at all engine loads and without danger of uncontrolled ignition, then closing said exhaust means and terminating the air introduction during the initial part of the piston compression stroke but only after at least 100° of crank angle movement to provide a full charge of swirling air therein irrespective of engine speed and load, compressing said full charge of swirling air within said disc-shaped combustion space during continuance of said piston compression stroke while maintaining the solid body air swirl within the range of 5-9 rotations per engine revolution, initiating the injection of liquid fuel into a localized portion of the compressed swirling air about 50-20 crank angle degrees prior to top dead center position of said piston compression stroke so as to impregnate with fuel a localized segment of said swirling air on one side of said disc-shaped combustion space as it rotates past the locus of fuel injection, positively igniting the first increment of injected fuel less than 75° of swirling movement of the impregnated segment from the locus of injection and substantially as soon as combustible fuel vapor-air mixture has formed therefrom and before uncontrolled ignition is possible to establish a flame front traveling through said localized segment counter to the direction of air swirl, continuing the injection of fuel into localized portions of fresh compressed swirling air immediately in advance of said traveling flame front at a controlled fuel-air weight ratio of 0.05-0.09 to progressively form an additional localized segment of combustible fuel vapor-air mixture which is immediately ignited by the traveling flame front and burned substantially as rapidly as formed to develop the power required on said cycle, the time of initiating fuel injection and the rate and duration of injection being coordinated to provide an approximate constant volume pressure rise of Otto cycle combustion closely adjacent the said top dead center position of said piston, then opening said exhaust means during the power stroke of said piston prior to the time in said stroke when air introduction begins to permit the cylinder pressure to blow down substantially to air inlet pressure, and repeating said cycle.

3. A two-stroke variable load internal combustion engine of the reciprocating piston type, comprising a power cylinder with reciprocating piston therein providing a disc-shaped combustion space operating on the Otto combustion cycle, air inlet means and exhaust means for said cylinder, said air inlet means having provisions for introducing on each cycle a full unthrottled charge of scavenging and combustion air irrespective of load into said cylinder in a solid body air swirl movement which effects scavenging of combustion products and also an air swirl velocity within said combustion space during the fuel injection period of about 5-9 rotations per engine revolution, fuel injection means for injecting fuel into a localized portion of the swirling air at one side of a diameter of said disc-shaped combustion space, positive ignition means located less than 75° of swirling movement from said fuel injection means for igniting the first increment of injected fuel as soon as it has formed a localized combustible fuel vapor-air mixture to establish a flame front extending generally across a radius of said combustion space, means for controlling said fuel injection means to initiate injection on each cycle about 50-20° before top dead center of the piston compression stroke, means for controlling the rate and duration of injection on each cycle to uniformly impregnate with fuel at a fuel-air weight ratio of 0.05 to 0.09 succeeding increments of the compressed swirling air immediately in advance of the formed flame front so that each succeeding increment becomes a combustible fuel vapor-air mixture as it reaches the flame front and burns substantially as rapidly as formed with the peak pressure rise closely adjacent top dead center, and with the load control of said engine being regulated solely by the quantity of fuel injected and consequently the proportion of swirling air impregnated on each cycle, means for opening said exhaust means and also said air inlet means during the latter part of the power stroke of said piston, and for closing said exhaust means and also said air inlet means during the earlier part of the immediately following compression stroke of said piston.

4. A two-stroke variable load internal combustion engine of the reciprocating piston type, comprising a power cylinder having a piston reciprocating therein providing a disc-shaped combustion space, an air intake and an exhaust for said cylinder, means for opening said air intake during the latter part of the power stroke of said piston to introduce unthrottled air to force products of combustion from the previous cycle through said exhaust to obtain efficient scavenging thereof without danger of ignition, said air intake being constructed to impart a high velocity of swirling movement of substantially solid body rotational type of 5 to 9 rotations per engine revolution to the air within said cylinder, means for closing said exhaust and said air intake during the initial part of the piston compression stroke, said exhaust opening and closing means and also said air intake opening and closing means providing a cycle time of exhaust opening and air intake opening of at least 100 crank angle degrees, said piston then compressing said air within said cylinder into said combustion space while the solid body swirling movement of 5 to 9 rotations per engine revolution is maintained, a fuel injection nozzle carried by said cylinder in position to inject into a localized segment of the compressed swirling air at one side of a diameter thereof, means coordinated with engine operation for initiating injection of liquid fuel from said nozzle about 50-20° before top dead center of said piston compression stroke, means for immediately igniting the first increment of injected fuel less than 75° of swirling movement of the localized impregnated segment from said locus of injection and substantially as soon as a combustible fuel vapor-air mixture is formed therefrom and before uncontrolled ignition thereof is possible to establish a flame front across a radius of the swirling air traveling therethrough counter to the direction of air swirl, means for controlling the rate of continued fuel injection on each cycle in accordance with air swirl velocity into localized portions of fresh compressed swirling air and with a controlled distribution at said one side of a diameter of the swirling air immediately in advance of the formed flame front to impregnate localized portions with fuel at a fuel-air weight ratio of 0.05 to 0.09, thereby progressively forming additional segments of combustible fuel vapor-air mixture which are ignited by said flame front and burned substantially as rapidly as formed, and means for controlling the duration of injection on each cycle to develop the power required solely by the quantity of fuel injected and consequently the proportion of the swirling air which is impregnated, said means providing a peak pressure of Otto cycle combustion closely adjacent the top dead center position of said piston to efficiently drive the same on a power stroke, and means for opening said exhaust during the latter part of said power stroke prior to the opening of said air intake to provide blow-down of cylinder pressure substantially to air inlet pressure before said air intake opens.

5. A two-stroke variable load internal combustion engine of the reciprocating piston type, comprising a power cylinder having a piston reciprocating therein and providing a disc-shaped combustion space as herein defined, an unthrottled air intake means adjacent one end of said cylinder, exhaust means adjacent the opposite end of said cylinder, means for opening said exhaust means during the latter part of a power stroke of said piston, independent means for opening said air intake means during the latter part of said power stroke of said piston and with a time lag after the opening of said exhaust, said air intake having provisions for imparting a high velocity swirling movement of substantially solid body rotational type of 5 to 9 rotations per engine revolution to the introduced air which advances in a column in unidirectional manner through said cylinder from said intake to said exhaust to scavenge products of combustion from said cylinder, said exhaust means having provisions for closing said exhaust during the initial portion of the return compression stroke of said piston, and said independent means having provisions for closing said air intake during the initial portion of said piston compression stroke from 0 to 10 crank angle degrees after the closing of said exhaust, whereby a full charge of swirling air irrespective of load remains in said cylinder which is then compressed by said piston into said disc-shaped combustion space while the solid body swirling movement of 5 to 9 rotations per engine revolution is maintained, a fuel injection nozzle carried by said cylinder in position to inject into a localized segment of swirling air at one side of said disc-shaped combustion space, positive ignition means carried by said cylinder within said disc-shaped combustion space less than 75° of swirling movement on the air-downstream side of said nozzle in position to be contacted by the localized segment of combustible fuel vapor-air mixture substantially as soon as formed from the first increment of injected fuel, means for initiating injection of liquid fuel from said nozzle about 50-20° before top dead center of said piston compression stroke, means for actuating said positive ignition means to positively ignite said first increment of injected fuel to establish a flame front traveling counter to the direction of air swirl and before either knocking or uncontrolled ignition is possible, and means for controlling the rate and duration of injection following ignition to impregnate shortly in advance of the traveling flame front additional localized quantities of the swirling air at a controlled fuel-air weight ratio of 0.05 to 0.09 to progressively form additional segments of combustible fuel vapor-air mixture which are ignited by the traveling flame front and burned substantially as rapidly as formed to provide the power required on said cycle, and to provide a peak pressure rise of Otto cycle combustion close to the upper dead center position of said piston to efficiently drive the latter on its power stroke.

6. A two-stroke internal combustion engine according to claim 5, having opposed reciprocating pistons confining said disc-shaped combustion space therebetween at the central portion of said cylinder during the latter part of the compression stroke of said pistons, said exhaust means comprising a circumferential series of ports formed through the cylinder wall adjacent one end of said cylinder, access thereto being controlled by one of said pistons, said air intake means comprising a circumferential series of ports with inclined side walls formed through the cylinder wall adjacent the other end of said cylinder, access thereto being controlled by said other piston, said injection nozzle being mounted at the central portion of said cylinder in position to inject into said disc-shaped combustion space in the direction of air swirl, said positive ignition means being positioned adjacent the periphery of said disc-shaped combustion space closely adjacent an edge of the fuel jet from said nozzle and at a radial angle of more than 20° and less than 75° from said nozzle tip, and said piston controlling said exhaust ports being connected to lead said piston controlling said air intake ports about 10-20° of crank angle movement.

7. A two-stroke internal combustion engine according to claim 5, wherein said exhaust means comprises a circumferential series of ports formed through the wall of said cylinder somewhat above the lower position of piston travel on a power stroke, and said air intake comprises at least one port positioned at the head end of said cylinder and controlled by a poppet valve having a shroud set tangentially of the combustion space, whereby an additional length of time in each cycle is provided for scavenging and cooling the fuel nozzle tip by the inflowing swirling column of intake air.

References Cited in the file of this patent

UNITED STATES PATENTS

| Number | Name | Date |
|---|---|---|
| 1,515,391 | Keller | Nov. 11, 1924 |
| 2,048,223 | Scott | July 21, 1936 |
| 2,096,327 | Howard | Oct. 19, 1937 |
| 2,137,344 | McCarthy | Nov. 22, 1938 |
| 2,484,009 | Barber | Oct. 11, 1949 |

FOREIGN PATENTS

| Number | Country | Date |
|---|---|---|
| 147,730 | Great Britain | Aug. 4, 1921 |